United States Patent

Wilkinson

[15] 3,673,797
[45] July 4, 1972

[54] COMPOUND POWER PLANT

[72] Inventor: William H. Wilkinson, Columbus, Ohio

[73] Assignee: Perkins Services N. V., Curacao, Netherlands Antilles

[22] Filed: Dec. 8, 1970

[21] Appl. No.: 96,200

[52] U.S. Cl. ............................................... 60/13, 60/39.17
[51] Int. Cl. ........................................................... F02b 37/04
[58] Field of Search ........................... 60/13, 11, 39.16, 39.29

[56] References Cited

UNITED STATES PATENTS

| | | | |
|---|---|---|---|
| 2,580,591 | 1/1952 | Pouit | 60/13 |
| 2,898,731 | 8/1959 | Barr | 60/13 |
| 3,498,057 | 3/1970 | Kronogard et al. | 60/39.16 |
| 3,007,302 | 11/1961 | Vincent | 60/39.16 |
| 2,802,334 | 4/1957 | Fletcher et al. | 60/39.16 |
| 2,769,303 | 11/1956 | Lucia et al. | 60/13 |
| 2,880,571 | 4/1959 | Glamann | 60/13 |
| 2,503,410 | 4/1950 | Pouit | 60/11 |

Primary Examiner—Carlton R. Croyle
Assistant Examiner—Warren Olsen
Attorney—Gerhardt, Greenlee & Farris

[57] ABSTRACT

A power plant for driving a load comprises an internal combustion engine, an exhaust turbine, primary and secondary compressors, and first and second planetary differentials each having an input and two outputs. The first differential has its input driven by the engine output, its first output connected to the load, and its second output driving the secondary compressor. The turbine drives the primary compressor and the second differential, which has its first output connected to the first differential input and its second output connected to the load. The compressor discharges flow in series or in parallel through a heat exchanger to the engine inlet manifold and the engine exhaust drives the turbine. A portion of the net compressor discharge is by-passed around the engine through a heat exchanger to recover heat from the turbine exhaust, and through an afterburner to the exhaust turbine.

A speed control device connects the second output of the first differential and the load. The speed control device comprises a variable displacement hydrostatic pump driving a variable displacement hydrostatic motor, and a control for the displacements; it may also comprise an electric generator and motor set with a control for the fields.

26 Claims, 4 Drawing Figures

INVENTOR.
WILLIAM H. WILKINSON
BY
Gerhardt, Greenlee & Farris
ATTORNEYS

COMPOUND POWER PLANT

This invention relates to power plants and more particularly to a power plant having stages of supercharge and exhaust power recovery interconnected with a selectively controllable split power device to produce a desired power output characteristic.

In commercial vehicles such as trucks, the usual method of obtaining a high power output over a wide range of load speeds is to provide a large, naturally aspirated engine and to provide a multi-speed manually shiftable transmission or an automatic transmission to enable the engine to operate in a relatively high speed and high power output range. However, even with multi-speed or automatic transmissions, the optimum engine speed for maximum power output occurs only at as many load speeds as there are transmission speed ratios, since peak power occurs over a relatively narrow range of engine speeds. Moreover these units are heavy and bulky, especially the engine.

Current developments with gas turbine vehicle drives have produced somewhat lighter units, but with high fuel consumption and cost. Previous efforts to combine some of the fuel consumption advantages of the piston engine, particularly the diesel engine, with the gas turbine have provided turbocharged engines where the throughput, and therefore the power level, of a given engine is increased by compressing the inlet air to the engine with an exhaust turbine driven compressor. Only the engine is connected to the load and similar multi-speed manual or automatic transmissions are required. For the same maximum output power, the smaller turbocharged engine is generally lighter than the corresponding naturally aspirated engine. The degree of supercharge is limited, however, in that the exhaust carries more energy than the compression process requires and the piston engine does not recover excess exhaust energy efficiently.

Previous efforts also have included "gasifier" systems where the only load applied to the piston engine is its supercharging compressor and the high pressure engine exhaust is directed to a turbine for power delivery to the load. Two-cycle free piston gasifiers were developed, but suffered from a basic mismatch between piston device and compressor in that the piston device tends to create more power than the compression process requires.

Previous efforts also considered the compound engine where both the engine and turbine are arranged to contribute more optimum amounts of power to a gross total and the compressor requirements are subtracted from that gross output to give an optimum net power output. In this way higher levels of supercharge can be used, gaining compactness and overall efficiency. Such systems have been built but they have suffered from complexity and from needs for transmission elements to control the supercharge and for a multi-speed transmission between the engine and the load similar to that in conventional practice.

It is therefore desirable to have a compound power plant that utilizes the transmission functions for supercharge control so that maximum power can be maintained over a broad output speed range. Moreover, it is desirable to incorporate additional transmission functions required for load control into an interrelated system so that maximum power can be delivered to the load over the wide ranges of speeds required by commercial vehicles such as trucks.

It is also desirable to reduce both supercharge level and engine speed when delivering less power than the maximum with minimum adjustment. It is particularly desirable that this characteristic should exist similarly for a broad range of output speeds for both vehicular and stationary power plants.

General practice with electrical generation of alternating current is to directly couple the engine with the generator so that the engine must run at maximum rated speed (synchronous speed) regardless of load. It would be desirable to allow the engine speed and the supercharge to vary in proportion to power requirements at constant output speed to reduce the engine wear and provide significant overload characteristics in the system.

In many applications, such as marine propulsion, it is difficult to obtain an exact match between hull requirements, which often vary with the loading and trim of the vessel, and the engine delivery without a variable pitch propeller. It would be desirable to have a power plant with a power output unaffected by output shaft speed over a significant range of speeds accomplished inherently without adjustment so that a fixed pitch propeller can be used over broad matching ranges between propeller and hull.

In some applications where excess power is desired, it is desirable to burn extra fuel externally of the engine, adding this effect to the expansion through the turbine. The lower thermodynamic efficiency is accepted in return for the compact generation of extra power. This may also be increasingly important as concern about pollution leads to high temperature chemically active reactors in the engine exhaust. Recovery of energy generated in these exhaust reactors by expansion through an exhaust turbine can make these devices and/or the delay of complete combustion economically more attractive. In some cases it is economically attractive to pass excessive air through the compressor/turbine system, by-passing the excess around the engine so that fuel can be added to it for excess power generation.

It is an object of this invention to provide a power plant that will maintain a constant output speed by varying fuel input to the engine in response to a control signal and will automatically increase supercharge and engine speed as power demand increases without other adjustment and will decrease engine speed and supercharge as load decreases progressively toward an idle condition of minimum fuel, engine speed and supercharge.

It is another object of this invention to provide a power plant which maintains, without external adjustment, nearly constant maximum power at nearly constant supercharge over a range of output speeds in the neighborhood of 3:1 and which also maintains a rising output torque to stall even though the output power decreases in the region of slow output speeds toward stall.

It is a further object of this invention to provide a power plant which extends the output speed range where constant output power is delivered by a speed-control element carrying only part of the power from within the power plant to the load so that no additional transmission elements are required for the full forward speed range of such loads as commercial trucks.

It is a still further object to provide a power plant in which extra fuel can be burned in excess air passed by or through the engine to generate extra power.

A power plant according to the present invention for driving a load, typically consists of an air breathing engine, control means, fuel supply means, an exhaust expansion device, primary and secondary air breathing devices, first and second power splitting devices each having an input and two outputs, first connecting means connecting the output of the engine to the input of the first power splitting device, second connecting means connecting the first output of the first power splitting device to the load, third connecting means connecting the second output of the first power splitting device to the secondary air device, fourth connecting means connecting the output of the exhaust expansion device to the input of the primary air breathing device and to the input of the second power splitting device, fifth connecting means connecting the first output of the second power splitting device to the input of the first power splitting device, sixth connecting means connecting the second output of the second power splitting device to the load, air discharge means including first communicating means communicating the discharges of the air breathing devices to the inlet manifold of the engine, and second communicating means communicating the exhaust from the engine to the exhaust expansion device.

In a typical series connection, the primary air breathing device comprises a dynamic compressor, whose discharge is communicated to the fluid inlet of the secondary air breathing device, whose discharge is connected to the first communicating means. The secondary air breathing device preferably is a dynamic compressor, but it may be a positive displacement compressor. Alternatively, the discharges of the air breathing devices may be connected in parallel to the first communicating means, and each breathing device may be either a positive displacement compressor or a dynamic compressor.

The power plant may include a speed control device, interconnecting the second output of the first power splitting device and the load. The speed control device typically comprises a variable displacement hydrostatic pump driving a variable displacement hydrostatic motor with means for controlling their displacements. Another typical speed control device comprises an electric generator supplying power to an electric motor with means for controlling their fields.

The power plant may include exhaust fueling means communicating fuel to the exhaust and providing chemical reactions and substantially complete combustion of the mixture therein. The air discharge means may include passage means communicating a portion of the discharges of the air breathing devices either to the exhaust from the engine or separately to the exhaust expansion device, typically an exhaust turbine, the passage means typically including a regenerative heat exchanger communicating heat from the exhaust of the exhaust turbine to the communicated portion of the discharges.

The air discharge means may comprise means for increasing the load on the air breathing devices, such as adjustable means for communicating a portion of the discharges of the air breathing devices away from the power plant.

These and further objects, features and advantages of this invention will become more readily apparent upon reference to the following detailed description of the attached drawings wherein.

Figure 1:
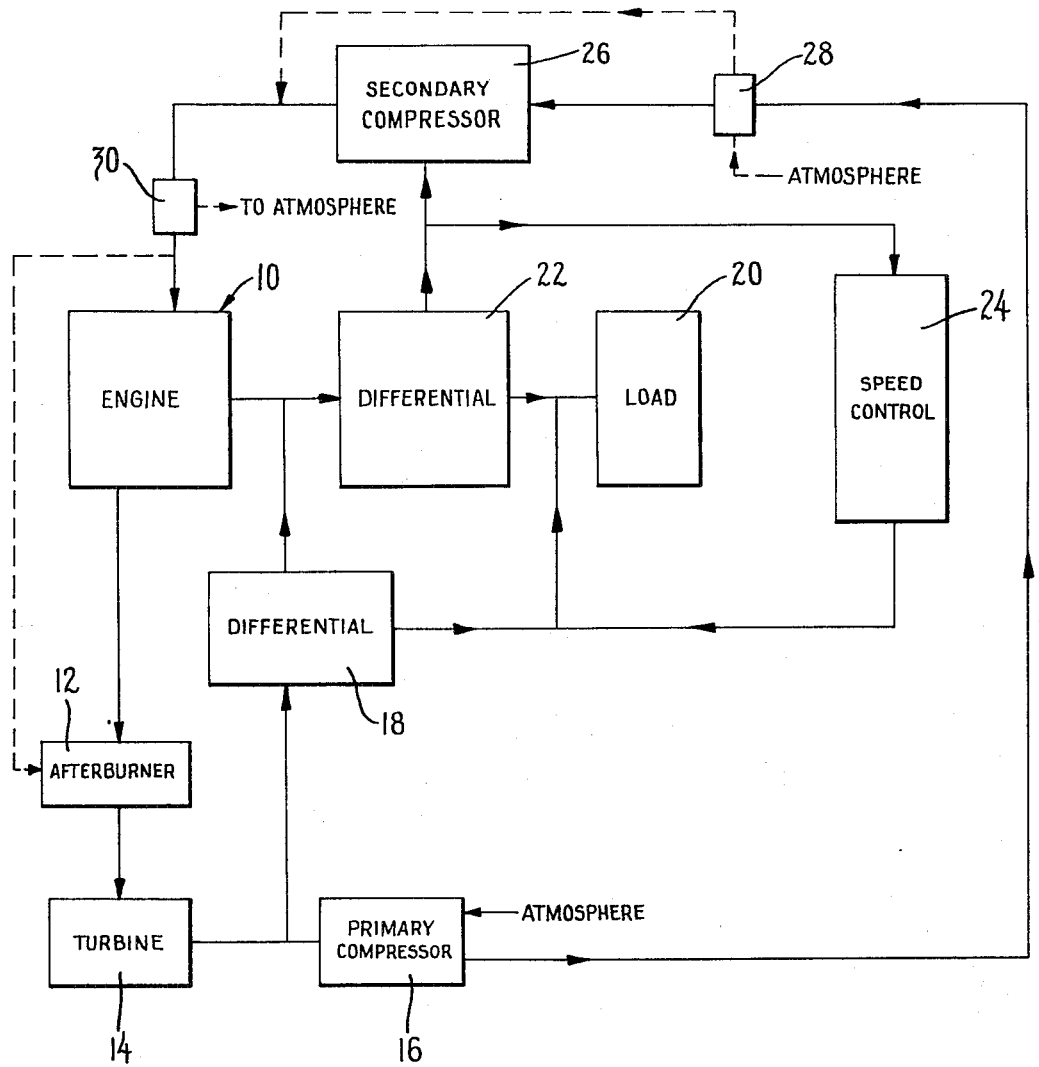
FIG. 1 is a general schematic representation of a power plant according to this invention.

Referring now to FIG. 1 of the drawings, the power plant according to this invention comprises an engine 10, the exhaust of which is passed through an afterburner 12 into an exhaust driven turbine 14. The turbine 14 drives a primary compressor 16 which receives air from the atmosphere. The turbine output also drives a differential 18 which has a first output connected to a load 20, and a second output connected to the engine output shaft which forms the input for another differential 22. A first output of the differential 22 joins with the first output of differential 18 to drive the load 20, while the second output is connected to the input of a speed control device 24, the output of which is connected to the load 20. The second output of differential 22 also drives a secondary compressor 26 which receives the compressed air output of the primary compressor 16 as shown in solid lines. A valve 28 is provided so that the output of compressor 16 may bypass compressor 26 which then receives atmospheric air. Thus the outputs of both compressors may flow in parallel or in series to the intake of engine 10. A valve 30 is provided in the joined compressor output line so that a portion of the compressed air may be vented to atmosphere, while a portion of the air exiting the valve flows to the afterburner 12.

Figure 2:
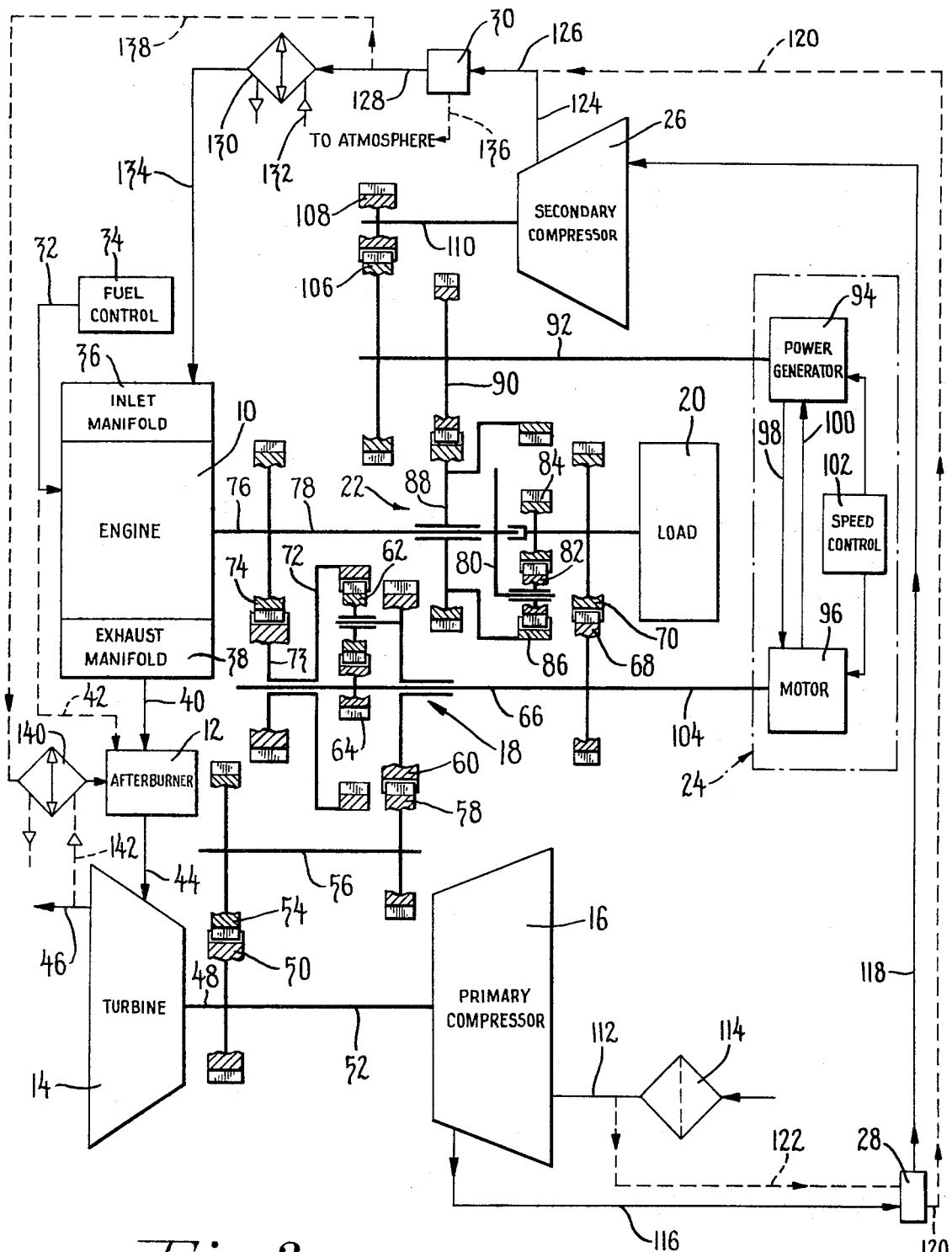
FIG. 2 is a more detailed schematic representation of the power plant of FIG. 1.

Referring now to FIG. 2 for more specific details of the inventive structure, the engine 10, preferably an air breathing diesel, is provided with fuel through a line 32 from an operator controlled fuel supply device 34. The engine includes an inlet manifold 36 and an exhaust manifold 38 from which the exhaust products are passed through an exhaust line 40 to the afterburner 12. The afterburner 12 is also supplied with fuel through a line 42 from the fuel supply device 34. The combustion products of the afterburner are passed through a line 44 to drive turbine 14 and are then exhausted to atmosphere through an exhaust system 46.

The exhaust turbine 14 has an output shaft 48 upon which is mounted a gear 50 and an input shaft 52 for the compressor 16. The gear 50 meshes with a gear 54 mounted on a shaft 56 which further mounts a gear 58 that meshes with a planet carrier 60 which forms the input for differential 18, preferably a planetary gearset. The carrier 60 mounts at least one planet gear 62 which meshes with a sun gear 64 mounted on an output shaft 66 forming the first output of the differential 18. The shaft 66 mounts a gear 68 which meshes with another gear 70 that comprises the input to the load 20. The planet gear 62 further meshes with a ring gear 72 that forms a second output of the differential 18 and includes an integral gear 73 which meshes with a gear 74 rigidly mounted on the output shaft 76 of the engine 10.

The shaft 76 has an extension 78 that mounts a planet carrier 80 forming the input of the differential 22, preferably a planetary gearset. Carrier 80 mounts at least one planet gear 82 which meshes with a sun gear 84 rigidly secured to the gear 70 forming a first output for the differential 22 driving the load 20. The planet gear 82 further meshes with a ring gear 86 that is mounted on a gear 88 forming a second output for the differential 22.

The output gear 88 meshes with another gear 90 mounted on an input shaft 92 of the speed control device 24. The shaft 92 drives a power generator 94, which is preferably a variable displacement hydrostatic pump. The pump 94 transmits fluid to and from a motor 96, which is preferably a variable displacement hydrostatic motor, through a pair of conduits 98 and 100. A control device 102, preferably operated by an engine speed responsive governor, is provided for selectively varying the displacements of the generator 94 and motor 96. An alternative arrangement would replace the hydrostatic pump and motor set with an electric motor and a generator with a controller for selectively varying the fields therein. The motor output shaft 104 is rigidly secured to gear 68 so that the speed control device 24 and the output shaft 66 of differential 18 combine to drive the input gear 70 of the load 20.

The input shaft 92 of speed control device 24 further mounts a gear 106 which meshes with a gear 108 mounted on the input shaft 110 of the compressor 26. Thus the other output of differential 22 drives both the speed control device 24 and the compressor 26.

The compressed air flow of the system will now be described. The primary compressor 16 receives air through a conduit 112 from an air cleaner 114 supplied from the atmosphere. In a series arrangement of the compressors, the output of compressor 16 is directed through a conduit 116 to the valve 28 and then through a conduit 118 to the secondary compressor 26. In a parallel arrangement of the compressors, compressed air in conduit 116 is transmitted through a conduit 120 so as to bypass the secondary compressor 26, while compressor 26 is supplied with air from a bypass line 122 through valve 28 and conduit 118. The output of compressor 26 is transmitted through a conduit 124 and joins with whatever compressed air is in conduit 120 in conduit 126 to enter valve 30.

In a normal condition the air mass in conduit 126 is transmitted through a conduit 128 into a heat exchanger or after cooler 130 which cools the air with atmospheric air passing through passages 132 to obtain lower peak engine operating temperatures. After exiting heat exchanger 130, the compressed air is fed through conduit 134 directly to the intake manifold 36 of the engine 10. Valve 30 may also be manually operated as a throttle to conduit 128 to bleed a portion of the air passing therethrough into a conduit 136 to the atmosphere to increase the load on the compressors. Depending on the power plant component characteristics, a predetermined portion of the air exiting valve 30 is directed through a conduit 138 to a heat exchanger 140 where it is heated by the turbine exhaust gasses flowing through conduits 142 to atmosphere. This enables energy recovery from the exhaust to increase system efficiency. Upon exiting heat exchanger 140 the air mass from conduit 138 is fed directly to the after burner 12 which is supplied with fuel through the line 42 and the combustible mixture of engine exhaust gasses and the additional air is burned and exits through conduit 44 to provide additional power driving turbine 14 and provide more complete combustion of the engine exhaust.

The operational characteristics of the power plant according to this invention will now be explained. It is seen that the driving torque, $T_{c1}$, of the primary compressor 16 is supplied by the turbine 14, whose torque is $T_t$, and a net torque, $T_1$, results in $$T_1 = T_t - T_{c1}. \tag{1}$$

This net torque is the input to differential 18, modified in proportion to the gear reductions of connecting means 50, 54, 56, 58 eventually driving the planet carrier, 60. Differential 18 proportions the net input torque, $T_1$ between that applied to the input 78 of differential 22, $T_{1e}$ and that applied to the load 20, $T_{1o}$, so that $$T_{1e} = K_1 T_1, \tag{2}$$

$$T_{1o} = K_2 T_1. \tag{3}$$

Constants $K_1$ and $K_2$ are fixed by the gears in differential 18 which also relates the speed of the input shaft 52 of the primary compressor 16, $\omega_{c1}$ with the speed of the engine output 76, $\omega_e$ and the speed of the load 20, $\omega_o$ by $$\omega_{c1} = K_1 \omega_e + K_2 \omega_o. \tag{4}$$

The input torque $T_2$ to differential 22 is combined with that of the engine $T_e$ so that $$T_2 = T_e + T_{1e}, \tag{5}$$

$$T_2 = T_e + K_1 (T_t - T_{c1}). \tag{5a}$$

Differential 22 delivers a torque $T_{2o}$ to the load 20 and a torque $T_{2a}$ to the second output 88 so that $$T_{2o} = c_1 T_2 \tag{6}$$

$$T_{2a} = c_2 T_2 \tag{7}$$

The output speed $\omega_{2a}$ of differential 22 is related by $$\omega_{2a} = (1/c_2)\omega_e - (c_1/c_2)\omega_o. \tag{8}$$

or since $$\omega_{c2} = f\omega_{2a}, \tag{9}$$

$$\omega_{c2} = (f/c_2)\omega_e - (fc_1/c_2)\omega_o \tag{8a}$$

where $f$, $c_1$, and $c_2$ are constants defined by the gear ratios in differential 22 and its connecting means.

The input torque $T_3$ to the power generator 94 of the speed control device 24 is the net after driving the secondary compressor 26 by the second output 88 of differential 22 so that $$T_3 = g\, T_{2a} - h\, T_{c2} \tag{10}$$

where $T_{c2}$ is the driving torque required by the secondary compressor 26 and $g$ and $h$ are constants defined by the gear ratios in the connecting means. The control device 102 defines the relationship between the speed $\omega_{2a}$ of input shaft 92, or the second output 88 of differential 22, and the speed of output shaft 104, $\omega_o$ so that $$\omega_o = \omega_{2a}/R, \tag{11}$$

where $R$ is the reduction ratio of speed control device 24, and the output torque from motor 96 applies a torque $T_{3o}$ to the load 20 through gears 68 and 70 so that $$T_{3o} = (R/g)\, T_3. \tag{12}$$

It is therefore seen that the net output torque $T_o$ applied to to the load 20 is the sum of these values, $$T_o = T_{1o} + T_{2o} + T_{3o} \tag{13}$$

and, since the general relation for power is $$T_o = (\text{Power})/\omega_o, \tag{14}$$

it is desired that these torques are functions of output speed, $$T_{1o} = f_1(\omega_o), \tag{15a}$$

$$T_{2o} = f_2(\omega_o), \tag{15b}$$

$$T_{3o} = f_3(\omega_o), \tag{15c}$$

so that $$f_1(\omega_o) + f_2(\omega_o) + f_3(\omega_o) = (\text{Power})/\omega_o \tag{16}$$

where the (Power) is constant over a wide range of output speeds, $\omega_o$.

If it is assumed that the speed control device 24 maintains the engine speed, $\omega_e$, at a constant value a unique value of $R$ will be defined for each output speed, $\omega_o$, so that $$R = (\omega_e/c_2\, \omega_o) - (c_1/c_2). \tag{17}$$

By inspection of equations 4 and 8, and assuming the engine speed, $\omega_e$, is controlled to be constant, it can be seen that the speed of primary compressor 16 increases with increasing speed $\omega_o$, of the load 20 while the speed of secondary compressor 26 decreases with increasing speed $\omega_o$, of load 20. Consequently, the compression function shifts automatically from secondary compressor 26 to primary compressor 16 as the speed of load 20 increases. It is in this way that the control function simultaneously effects the desired control of both the load 20 and the compressors 16, 26.

It should also be noted that the power fraction, $F$, that passes through speed control device 24 is $$F = \frac{T_{3o}}{T_{1o} + T_{2o} + T_{3o}} \tag{18}$$

and that it would be desirable to keep this value small in operating conditions where fuel consumption is important, for the most significant losses should be expected to be proportional to the power fraction $F$. It should be apparent that torques $T_{1o}$ and $T_{2o}$ are defined by the matching relationships between the engine torque $T_e$ the two compressor torques $T_{c1}$ and $T_{c2}$ and the turbine torque $T_t$ and that the output torque $T_{3o}$ from speed control device 24 carries the balance, $$T_{3o} = T_o - (T_{1o} + T_{2o}). \tag{19a}$$

Not only can $T_{3o}$ be zero for some situations but it is possible to so match the component characteristics that good approximations of constant power can be obtained for significant ranges of load speeds with speed control device 24 omitted, for such use as in marine propulsion and stationary applications. The ranges of load speeds for which full power is desired generally are quite large for trucks, however, and some form of speed control device is needed because of the wide variation in load speeds. It is generally more efficient to use speed control device 24 to accomplish this extended range than to add a transmission device to the power train load 20.

Reworking equation (19a) into equation (19b) gives a simpler form if a linearization of the turbine characteristic is used where $$T_t = A - B\omega_{c1} \tag{20}$$

where $A$ and $B$ are constants. The result is $$\frac{T_3}{g} = \frac{T_{3o}}{R} = [\alpha - \beta\omega_e] - \left[\gamma\omega_0 + \left(\frac{h}{g}\right)T_{c2} + (C_2 K_1)T_{c1}\right] \tag{19b}$$

where
$\alpha = C_2 T_e + K_1 C_2 A$
$\beta = C_2 K_1^2 B$
$\gamma = C_1 K_1 B.$ The first term $[\alpha - \beta\omega_e]$ of equation (13b) is readily seen to be constant if the engine speed $\omega_e$ is constant. The second term controls the characteristics for speed control device 24. Since the speed of primary compressor 16 increases with load speed $\omega_o$ its torque will tend to increase with load speed; the torque of secondary compressor 26 would have to decrease markedly with increases in load speed to maintain the second term constant to enable selection of system constants and keep $T_3$ zero over a range of load speeds. The speed of secondary compressor 26 does decrease as the load speed increases so, for the preferred embodiment where both secondary and primary compressors 26, 16 are dynamic compressors connected in series and compressor torques increase with their rotation speed and inlet density, a properly matched design approximating constant power over a range of load speeds is possible with speed control device 24 omitted.

Table 1 shows the possible alternative arrangements of compressors. In series arrangement B, the secondary compressor is positive displacement and its driving torque increases directly with pressure rise which will increase with compressor speed. Although investigations to date have shown arrangement A to be more favorable for design, it is expected that some special applications may favor arrangement B. To a large extent, choice of the arrangement and type of compressors depends on component sizing and other characteristics.

| Primary Compressor type | Secondary Compressor type | Flow Interconnection of Compressors |
|---|---|---|
| A. Dynamic | Dynamic | Series |
| B. Dynamic | Pos. Disp. | Series |
| C. Pos. Disp. | Pos. Disp. | Parallel |
| D. Dynamic | Dynamic | Parallel |
| E. Pos. Disp. | Dynamic | Parallel |
| F. Dynamic | Pos. Disp. | Parallel |

Figure 3:
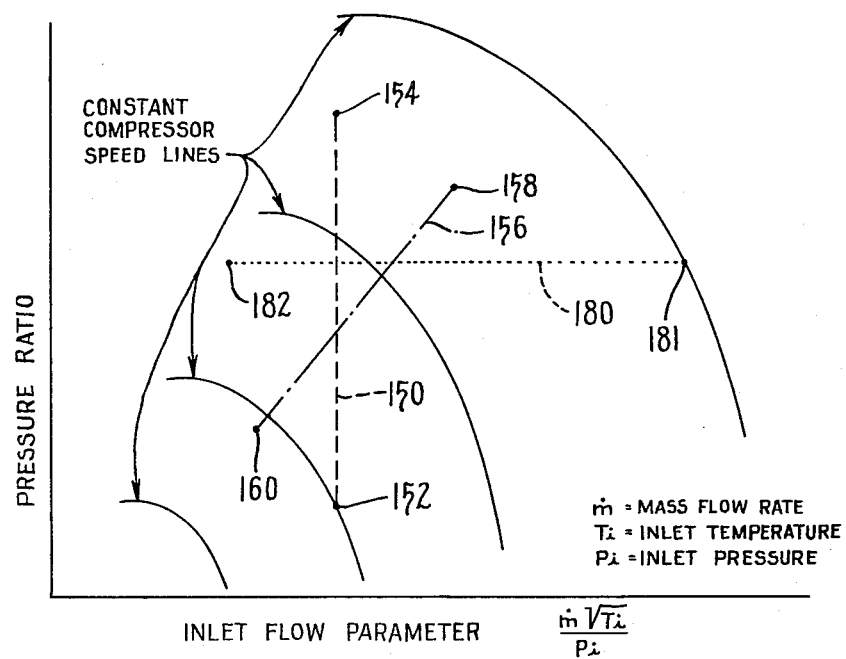
FIG. 3 is a graphic representation of a typical dynamic compressor characteristic appropriate for the compression means of this power plant.

It can also be seen that the air flow through the engine should be constant for constant power over the range of load speeds to keep the air/fuel ratio and the thermal efficiency constant. FIG. 3 shows a typical operation characteristic for a dynamic compressor upon which the dashed line 150 represents the operating characteristic of primary compressor 16 as its speed increases with increasing load speed and constant engine speed, from point 152, with the load nearly stationary, to point 154 at maximum load speed. The chain line 156 represents a typical secondary dynamic compressor characteristic operating from points 158 to 160 for the same range of load speeds which takes into account the variation of inlet temperature and pressure with load speed.

Figure 4:
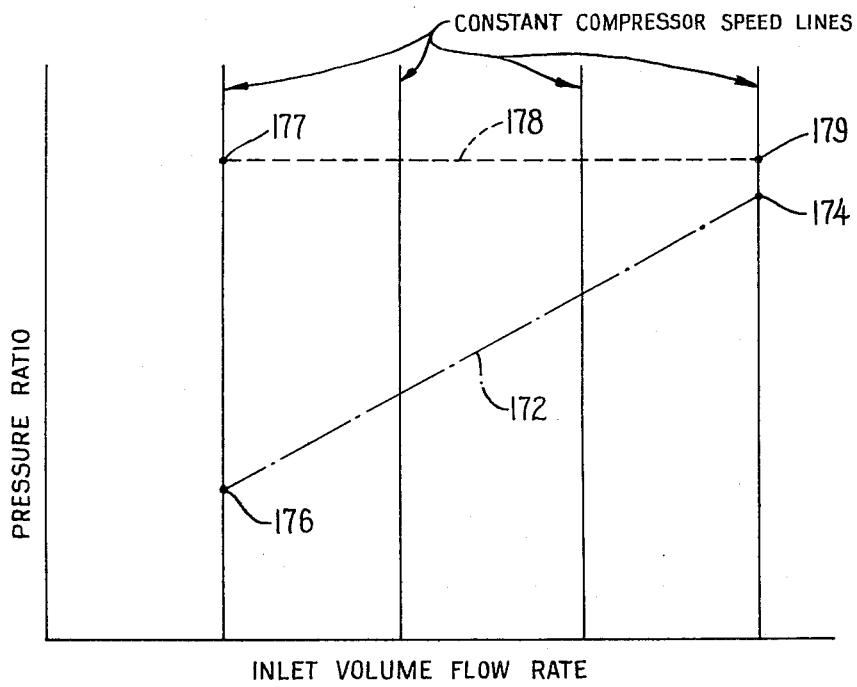
FIG. 4 is a graphic representation of a typical positive displacement compressor characteristic as would alternatively be appropriate for the compression means in this power plant.

FIG. 4 shows a typical positive displacement compressor characteristic, and chain line 172 between points 174 and 176 shows operation as a secondary compressor in arrangement B.

It should be noted that a positive displacement compressor cannot be used as the primary compressor in a series connection, because mass flow cannot be constant with appropriately varying compressor speeds and constant inlet conditions. For this reason the only series arrangements listed in Table 1 comprise dynamic primary compressors.

When the primary and secondary compressors 16, 26 are in parallel, both compressors operate over the same pressure rise ratio. Dashed line 178 in FIG. 4 represents typical operating characteristics of the two positive displacement compressors of arrangement C, the primary compressor 16 delivering a small mass flow 177 near stall of load 20 at which time the secondary compressor 26 is delivering a large mass flow 179, the total of these two being delivered to the engine 10. As load speed increases, secondary compressor 26 delivers progressively less air and primary compressor 16 delivers progressively more, eventually exchanging operating points with the secondary compressor 26 delivering small mass flow 177 at maximum load speed and primary compressor 16 delivering large mass flow 179.

Dotted line 180 in FIG. 3 represents the operating characteristics of two dynamic compressors connected in parallel, as in arrangement D. To those skilled in the art it is apparent that dynamic compressors would satisfy this operating characteristic less satisfactorily without auxiliary control such as variable inlet guide vanes and, even then, are less appropriate for parallel connection than positive displacement compressors. The positive displacement compressors of arrangement C will vary their torques very little with their speed so the control function of speed control device 24 defined by equation (19b) is needed. For the dynamic compressors of arrangement D the torque to drive each compressor increases markedly with its increasing speed so a different control function requirement results. Arrangements E and F are options giving different control function requirements and opportunities.

Another view of the different configurations in Table 1 can be developed by creating a net compressor speed parameter $\Omega$ where $$\Omega = a\omega_{c1} + b\omega_{2a} \qquad (21)$$

$a$ and $b$ are unifying coefficients between the two compressors and their flows. From equations 4 and 8, equation 21 becomes $$\Omega = \omega_e \left(ak_1 + \frac{b}{c_2}\right) + \omega_0 \left(ak_2 - b\frac{c_1}{c_2}\right) \qquad (21a)$$

and it is immediately apparent that, if $$ak_2 = b\, c_1/c_2, \qquad (22)$$

$$\Omega = \omega_e \left(ak_1 + \frac{b}{c_2}\right) \qquad (21b)$$

For parallel flow positive displacement compressors as in arrangement C, the net air flow is directly proportional to the compressor speed so $a$ and $b$ are sizing constants between compressors and the air flow is proportional to $\Omega$. By design, the flow can be insensitive to load speed $\omega_o$ and will be directly proportional to engine speed.

This means that for a four-cycle engine whose breathing throughput is roughly proportional to engine speed, the level of supercharge will change little with engine speed for parallel arrangement C. Two-cycle engines in flow relation with an exhaust turbine, however, will trap a lesser fraction of the air in the cylinder as the engine speed reduces, because a two-cycle engine is a flow orifice in series with the turbine also acting as an orifice and the effective supercharge decreases.

For dynamic compressors, however, $a$ and $b$ are not constants and more properly should be treated as functional relationships, dependent in addition upon inlet conditions to the compressor in question. The flow factor $\Omega$ should be written $$\Omega = a'\,(k_1\omega_e + k_2\omega_o) + b'\,1/c_1\,\omega_e - c_1/c_2\,\omega_o \qquad (21c)$$

where $a'$ and $b'$ represent functional dependence on the primary and secondary compressor speeds respectively. To those skilled in the art, however, the trend should be clear that the net throughput of air will increase much faster than the engine speed with dynamic compressors and the supercharge will increase with increasing engine speed at any given load speed.

It can now be seen that the net torque $T_1$ defined by equation (1) increases very sharply as load speed $\omega_o$ decreases when the linearized turbine characteristics of equation (20) is included so that $$T_1 = [A - k_1 B\omega_e] - [k_2 B\omega_o + T_{c1}]. \qquad (1a)$$

At constant engine speed the first bracketed term in equation (1a) is constant but the second term is affected by both the turbine characteristics and the compressor characteristics, the turbine torque increasing as $\omega_o$ decreases, but the compressor torque being dependent on the arrangement selected from Table 1, remembering that the primary compressor speed increases as load speed $\omega_o$ decreases according to equation (4). For arrangements A, B, D, and F, the primary compressor torque increases roughly as a square of its speed, while, for the other arrangements using positive displacement primary compressors, compressor torque is essentially insensitive to compressor speed. In arrangement A, the preferred embodiment, a high rate of torque increase is defined by equation (1a) which acts simultaneously according to equations (2) and (3) upon the load and upon the engine shaft. At pressure ratios of about 4:1 across the exhaust turbine, its net torque $T_{1e}$ provides a very large torque increase as load speed decreases providing the high "torque backup" desired for vehicle engines and necessary for constant power delivery with varying load speed.

The net "engine shaft" torque $T_2$ cannot be fed through differential 22 to the output as $T_{2o}$ unless the proportional reaction torque $T_{2a}$ is made available. As load speed decreases, the speed of secondary compressor 26 connected to the reaction side (second output 88) increases according to equation (8) and, for series arrangements A and B in Table 1, experiences an increase in pressure rise. The net effect increases the secondary compressor torque $T_{c2}$ as desired and it can be the only reaction source comprising $T_{2a}$ as in equation (10) when $T_3$ is zero.

Matching experience to date, however, indicates that the uncontrolled system ($T_3 = 0$ because the speed control device 24 is omitted) can be arranged to give a reasonable approximation of constant power over a load speed range of only about 2.5:1, with the torque continuing to increase to a net multiplication ratio of about 4:1 as the load speed decreases to stall with the engine speed slowing to about one-half its rated speed.

Adding speed control device 24 not only permits the external control of engine speed with relation to load speed but also leads to a favorable modification of the power splitting constants, $c_2$ and $c_1$ (also $f$ and $h$ and to a lesser degree $K_1$ and $K_2$), because more power can be absorbed by the reaction output 88 of differential 22. At maximum load speed, power generator 94 would rotate at about half its maximum speed and would deliver about one-fourth of the net power output to the load through motor 96 running at its highest speed. At about 30 percent maximum load speed the power generator has almost doubled its speed so the change in reduction ratio $R$ in speed control device 24 is about 6:1 and the power flow through the speed control device is more than half of the net output.

If the speed control system comprises hydrostatic elements, the speed control 102 adjusts the pump and motor displacements either in direct response to the operator or automatically, e.g., in response to an engine speed signal modified by the fuel manual control condition. At high load speed at maximum power, pump 94 would be at full displacement, the motor 96 at partial displacement, and the hydraulic pressure would be modest. As the load speed decreases at maximum power, the engine can be kept at maximum rated speed by increasing the motor displacement, the pump displacement remaining constant and the system pressure increasing slightly until the motor reaches full displacement. Further decreases in load speed require reduction of pump displacement with the motor at full displacement and are accompanied by marked increases in the hydraulic system pressure. At extremely slow load speeds the pump becomes less efficient primarily because of the small displacement and flow relative to the leakage flow associated with the high pressure. A stable stall condition will be reached where the pumped flow matches the leakage flows as high pressure is imposed across the motor and, when added to the other driving torques $T_{1o}$ and $T_{2o}$ provides a very large torque multiplication.

This is not unlike the characteristics of a torque converter in that a large torque multiplication is produced with energy being given up to the hydraulic fluid to create a large torque. It is unlike a torque converter, however, in a number of respects, all advantageous. First, the system torque multiplication can be designed to be at least 10:1. Second, a significant portion of the power generated at stall is degraded in the exhaust turbine and passes directly from the system through the exhaust gas flow (i.e., some of the entropy rise associated with the creation of stall torque occurs across the exhaust turbine). Third, the control system can allow the engine to idle at a low speed and low fuel rate by minimizing the drag on the engine and the creeping torque delivered to the load. Fourth, the power flow in the speed control device can be readily reversed for dynamic braking of the load delivering power to the two compressors and to the engine where it is dissipated in mechanical friction and in air flow losses, the latter energy discharged from the system with the exhaust. Moreover, this retarding can be enhanced by placing restrictions in the compressor discharges that both raise the compressor discharge pressures and dump air directly overboard so that the air flow through the engine and turbine is small.

An electrical system would work similarly with the speed control altering the field strengths and winding arrangements according to practice well established in electrical traction drives but with one significant difference. The generator speed increases since its power flow must increase so that voltage can be increased, potentially improving direct current electrical generation systems.

Since the speed range at constant power has been shown above to be related to the power level at the reaction output 88 of differential 22, it is desirable in some cases to increase the power absorbed by the secondary compressor by increasing the flow of air through it and by-passing this excess flow around the engine to the turbine via conduit 138. In addition, the relative power (or torque) levels between the engine and turbine are altered so that the engine torque $T_e$ in equation (5a) becomes a relatively smaller term and further extension of the constant power range is indicated (i.e., the same range at constant power can be achieved with smaller power levels carried by the speed control device). Some degradation of thermodynamic efficiency would result but may be justified by the lower power levels in the speed control device. Since the by-pass air will be much cooler than the exhaust from the turbine and since it will be at a higher pressure than the inlet to the turbine, it is desirable to accomplish the required pressure reduction in heat exchanger 140 where the by-passed air is heated by the turbine exhaust. Since the only flow loss chargeable to the system for this regenerative heat exchange is that in the turbine exhaust and since the turbine exhaust flow is greater than the by-pass flow to minimize the exhaust flow pressure drop, a net improvement in thermodynamic efficiency should result.

It is clear that the by-passed air, even after regenerative heating, is cooler than the engine exhaust and contains unused oxygen. The combustion of extra fuel in afterburner 12 raises the temperature of the by-pass air and increases the power level available from the exhaust turbine and thus boosts the overall power level from the system. Although this excess or boost power delivery is not achieved with the same theoretical efficiency as that of the fuel burned in the engine, the net effect is only a minor degradation acceptable for boost power needs as a matter of course.

It is also well known that exhaust reactors for improving the emissions of engines work best at moderate temperatures and pressure. The introduction of the engine exhaust 40 into selected regions of the afterburner 12 should be anticipated as beneficial to the completion of any reactions quenched in the engine cylinder.

The preferred embodiment can be seen to combine the best effects of a gas turbine with those of a diesel at maximum power. Moreover, at lower powers typical of cruising situations, the engine speed is reduced along with the pressure levels in inlet and exhaust manifolds and the primary energy source is the diesel engine. The fuel economy, therefore, is typical of a diesel engine at part loads all the way to, and including, idle. This system truly combines the good aspects of both gas turbine and diesel engines.

Of course, equivalent elements may be used for those specifically detailed herein without departing from the scope of the invention. Either or both of the mechanical differentials could be replaced with a different mechanical, hydraulic or electrical one and adjustment of the defining constants would be employed. The speed control device could be mechanical or could be hydraulic or electrical devices other than those described herein. Air flow controls such as variable inlet guide vanes to either of the dynamic compressors could be employed to modify the matching relationships between the elements. The air breathing engine could be a two- or four-cycle diesel or spark ignition engine, or could be an external combustion type such as a gas turbine. These are merely some of the alternatives envisaged within the scope of this invention which could yield a power plant having the same or similar power output characteristics and are contemplated within the scope of the following claims.

I claim:

1. A power plant for driving a load, characterized by an air breathing engine, control means, fuel supply means, an exhaust expansion device, primary and secondary compressor devices, first and second power splitting devices each having an input and two outputs, first connecting means connecting the output of the engine to the input of the first power splitting device, second connecting means connecting the first output of the first power splitting device to the load, third connecting means connecting the second output of the first power splitting device to the secondary compressor device, fourth connecting means connecting the output of the exhaust expansion device to the input of the primary compressor device and to the input of the second power splitting device, fifth connecting means connecting the first output of the second power splitting device to the input of the first power splitting device, sixth connecting means connecting the second output of the second power splitting device to the load, air discharge means including first communicating means communicating the discharges of the compressor devices to the inlet manifold of the engine, and second communicating means communicating the exhaust from the engine to the exhaust expansion device.

2. A power plant according to claim 1, characterized by the exhaust expansion device being a turbine.

3. A power plant according to claim 1, characterized by the first communicating means including cooling means.

4. A power plant according to claim 1, characterized by the first communicating means including passage means connecting each of the compressor devices in parallel to the inlet manifold.

5. A power plant according to claim 4, characterized by the primary compressor device comprising a positive displacement compressor and the secondary compressor device comprising a second positive displacement compressor.

6. A power plant according to claim 4, characterized by the primary compressor device comprising a positive displacement compressor and the secondary compressor device comprising a dynamic compressor.

7. A power plant according to claim 4, characterized by the primary compressor device comprising a dynamic compressor and the secondary compressor device comprising a positive displacement compressor.

8. A power plant according to claim 4, characterized by the primary compressor device comprising a dynamic compressor and the secondary compressor device comprising a dynamic compressor.

9. A power plant according to claim 1, characterized by the primary compressor device comprising a dynamic compressor, and the first communicating means including passage means connecting the compressor discharge serially through the secondary compressor device to the inlet manifold.

10. A power plant according to claim 9, characterized by the secondary compressor device comprising a second dynamic compressor.

11. A power plant according to claim 9, characterized by the secondary compressor device comprising a positive displacement compressor.

12. A power plant according to claim 1, characterized by the control means including a speed control device having an input and output, means connecting the speed control device input to the second output of the first power splitting device, and means connecting the speed control device output to the load.

13. A power plant according to claim 12, characterized by the speed control device comprising a variable displacement hydrostatic pump connected to the input and driving a variable displacement hydrostatic motor connected to the output, and means for controlling the displacements therein.

14. A power plant according to claim 12, characterized by the speed control device comprising an electric generator connected to the input and supplying power to an electric motor connected to the output, and means for controlling the fields therein.

15. A power plant according to claim 2, characterized by the fuel supply means including exhaust fueling means communicating fuel to the second communicating means and combustion means for providing chemical reactions and substantially complete combustion of the mixture in the second communicating means.

16. A power plant according to claim 2, characterized by the air discharge means including passage means communicating a portion of the discharges of the compressor devices to the second communicating means.

17. A power plant according to claim 16, characterized by the said passage means including a regenerative heat exchanger communicating heat from the exhaust of the exhaust expansion device to said portion of the discharges of the compressor devices.

18. A power plant according to claim 16, characterized by the fuel supply means including exhaust fueling means communicating fuel to the second communicating means, and combustion means for providing chemical reactions and substantially complete combustion of the mixtures of fuel, exhaust from the engine and said portion of the discharges of the compressor devices.

19. A power plant according to claim 17 characterized by fuel supply means including exhaust fueling means communicating fuel to the second communicating means, and combustion means for providing chemical reactions and substantially complete combustion of the mixtures of fuel, exhaust from the engine and said portion of the discharges of the compressor devices.

20. A power plant according to claim 1, characterized by the air discharge means including means for increasing the load on the compressor devices.

21. A power plant according to claim 20, characterized by the load increasing means comprising adjustable means for communicating a portion of the discharges of the air breathing devices away from the power plant.

22. A power plant for driving a load, characterized by an air breathing engine, control means, fuel supply means, an exhaust turbine, primary and secondary compressor devices, first and second differentials each having an input and two outputs, first connecting means connecting the output of the engine to the input of the first differential, second connecting means connecting the first output of the first differential to the load, means connecting the second output of the first differential to the secondary compressor device, third connecting means connecting the output of the exhaust expansion device to the input of the primary compressor device and to the input of the second differential, fourth connecting means connecting the first output of the second differential to the input of the first differential, means connecting the second output of the second differential to the load, first communicating means communicating the exhaust from the engine to the exhaust expansion device, air discharge means including second communicating means communicating the discharges of the compressor devices to the inlet manifold of the engine and passage means communicating a portion of said discharges to the first communicating means, the fuel supply means including exhaust fueling means communicating fuel to the first communicating means, and combustion means for providing chemical reactions and substantially complete combustion of the mixtures of fuel, exhaust from the engine and said portion of the discharges of the compressor devices.

23. A power plant according to claim 22, characterized by the said passage means including a regenerative heat exchanger communicating heat from the exhaust of the exhaust expansion device to said portion of the discharges of the compressor devices.

24. A power plant according to claim 22, characterized by the first communicating means including cooling means, and the air discharge means comprising adjustable means for communicating a part of the discharges of the compressor devices away from the power plant.

25. A power plant according to claim 22, characterized by the control means including a speed control device having a variable displacement hydrostatic pump driving a variable displacement hydrostatic motor with means controlling the displacements therein, means connecting the pump to the second output of the first differential, and means connecting the motor to the load.

26. A power plant according to claim 25, characterized by the first communicating means including cooling means, the air discharge means including a regenerative heat exchanger communicating heat from the exhaust of the exhaust expansion device to said portion of the discharges of the compressor devices and load increasing means comprising adjustable means for communicating a portion of the discharges of the compressor devices away from the power plant.

* * * * *